United States Patent
Ramon et al.

(10) Patent No.: US 8,648,508 B2
(45) Date of Patent: Feb. 11, 2014

(54) SMALL ELECTRIC MOTOR AND METHOD FOR PRODUCING A SMALL ELECTRIC MOTOR

(75) Inventors: David Ramon, Caslano (CH); Remo Hofstetter, Lucerne (CH); Hugo Fritschy, Sachseln (CH)

(73) Assignee: Maxon Motor AG, Sachseln (CH)

( * ) Notice: Subject to any disclaimer, the term of this patent is extended or adjusted under 35 U.S.C. 154(b) by 382 days.

(21) Appl. No.: 13/183,656

(22) Filed: Jul. 15, 2011

(65) Prior Publication Data
US 2012/0013209 A1 Jan. 19, 2012

(30) Foreign Application Priority Data
Jul. 19, 2010 (EP) .................................... 10007455

(51) Int. Cl.
*H02K 11/00* (2006.01)
*H02K 3/52* (2006.01)
*H02K 5/22* (2006.01)

(52) U.S. Cl.
CPC ................ *H02K 11/00* (2013.01); *H02K 3/525* (2013.01); *H02K 5/225* (2013.01); *H02K 2203/15* (2013.01); *H02K 2211/03* (2013.01)
USPC ................... 310/71; 310/156.66; 310/156.69; 310/156.71; 310/156.73; 310/263; 310/49.01; 310/49.43

(58) Field of Classification Search
CPC ....... H02K 11/00; H02K 3/525; H02K 5/225; H02K 2203/15; H02K 2211/03
USPC ........... 310/49.01, 49.43, 71, 156.66, 156.69, 310/156.71, 156.73, 263
IPC ..................................................... H02K 11/00
See application file for complete search history.

(56) References Cited

U.S. PATENT DOCUMENTS

| | | | | |
|---|---|---|---|---|
| 3,412,393 A | * | 11/1968 | Watkins | 340/815.64 |
| 5,023,498 A | * | 6/1991 | Abe | 310/71 |
| 5,754,025 A | | 5/1998 | Nanae et al. | |
| 6,066,906 A | * | 5/2000 | Kalsi | 310/179 |

(Continued)

FOREIGN PATENT DOCUMENTS

| | | |
|---|---|---|
| DE | 3639004 A1 | 5/1988 |
| DE | 4447027 A1 | 8/1995 |
| JP | 62-92738 A | 4/1987 |

OTHER PUBLICATIONS

European Search Report issued on Nov. 15, 2010, by European Patent Office as the International Searching Authority for European Application No. 10007455.

*Primary Examiner* — John K Kim
(74) *Attorney, Agent, or Firm* — Buchanan Ingersoll & Rooney PC

(57) ABSTRACT

A small electric motor is disclosed, such as a claw pole motor. An exemplary small electric motor includes a housing, a stator having at least two stator windings, a rotor having a rotational axis, and a flexible conductor foil for the electrical connection of the stator windings. The conductor foil includes winding connection contacts, external connection contacts and conductor paths between the winding connection contacts and the external connection contacts. Taps of the stator windings are electrically contacted with the winding connection contacts of the conductor foil. The conductor foil can be configured as an elongated strip having at least two connection portions which are arranged in spaced-apart relationship with each other and include winding connection contacts.

12 Claims, 2 Drawing Sheets

(56) References Cited

U.S. PATENT DOCUMENTS

| | | |
|---|---|---|
| 6,836,050 B2 * | 12/2004 | Akabane et al. ............... 310/239 |
| 7,816,822 B2 * | 10/2010 | Nashiki ....................... 310/49.23 |
| 7,911,094 B2 * | 3/2011 | Yajima ............................ 310/71 |
| 2002/0047334 A1 * | 4/2002 | Aoshima ..................... 310/49 R |
| 2004/0041495 A1 * | 3/2004 | Suzuki et al. ................. 310/259 |
| 2005/0106046 A1 * | 5/2005 | Winkler ..................... 417/423.3 |
| 2012/0013209 A1 * | 1/2012 | Ramon et al. .................. 310/71 |

* cited by examiner

SMALL ELECTRIC MOTOR AND METHOD FOR PRODUCING A SMALL ELECTRIC MOTOR

The present invention relates to a small electric motor and to a method for producing such a motor. Particularly, the present invention relates to a claw pole motor.

Many fields of application for electric small-sized motors require an ever increasing degree of miniaturization. Electric motors have to be built in more and more decreasing and compact sizes in order to be suited for applications e.g. in medical engineering. This requires particularly space-saving motor housing constructions and an intelligent efficient arrangement and design of the individual motor components. An optimized arrangement of the electrical connections and conductor paths in the motor itself plays a major role.

It is generally known from the prior art that the electrical connections of the stator windings are guided as stranded wires out of the motor housing. DE 36 39 004 A1 further discloses a claw pole motor having two stator windings, in which a printed circuit board is used for electrically contacting the two stator windings. The printed circuit board is ring-shaped and arranged between the two stator windings. Taps of the stator windings are electrically connected to winding connection contacts on the printed circuit board. Conductor paths on the printed circuit board extend from the winding connection contacts to external connection contacts that are accommodated on one or a plurality of board projections projecting radially out of the housing of the motor. These radial projections of the printed circuit board are configured for a plug connection with an electrical connection cable. It is further described in DE 36 39 004 A1 that, instead of a printed circuit board, it is also possible to use a conductor foil, wherein arrangement and design of the conductor foil substantially conform to the principle of the printed circuit board. In the application of a conductor foil as described in DE 36 39 004 A1, projections of the foil on which the external connection contacts are accommodated are also radially guided out of the motor housing. Since the conductor foil is arranged between the two stator windings of the claw pole motor, the assembly of the motor turns out to be relatively complicated, and it is therefore difficult to automate such an assembly. Moreover, the radially outwardly guided connection contacts or projections of the conductor foil entail a large construction volume or great total diameter of the motor unit because the plug connections with the projections of the conductor foil are positioned radially outside of the housing. Moreover, the concept known from DE 36 39 004 A1 is relatively inflexible and just permits the electrical connection of two stator windings via a joint printed circuit board or conductor foil.

It is therefore the object of the present invention to indicate an innovative concept for a small electric motor, particularly a claw pole motor, which concept permits an easy manufacture and assembly of the small electric motor and provides for a space-saving arrangement of the electrical connections. Moreover, an inexpensive manufacture of the small electric motor is to be accomplished.

This object is achieved by the technical features of the independent claim 1. Hence, in a small electric motor having a conductor foil for the electrical connection of the stator windings the object is achieved according to the invention when the conductor is configured as an elongated strip having at least two connection portions that are arranged in space-apart relationship with each other and include winding connection contacts. Owing to the configuration of the conductor foil as an elongated strip, several stator windings can be electrically contacted at very different positions inside or outside of the electric motor. Owing to this very flexible concept of contacting the stator windings, the assembling process can also be configured to be much more flexible and less expensive than in the case of the concepts known from the prior art. The flexible elongated strip can be guided in any desired way through the electric motor or along the housing, thereby permitting an optimized utilization of the installation space and thus a further miniaturization. Furthermore, the arrangement of the external connection contacts is not subject to any spatial restrictions.

Further designs of the present invention are the subject of the sub-claims.

In a preferred embodiment of the present invention, the connection portions are oriented in a direction perpendicular to the rotational axis of the rotor of the small electric motor and are given a substantially circular annular configuration, with the rotor being enclosed by the circular annular connection portions. This permits an extremely space-saving arrangement of the connection portions in front of, between or after the stator windings to be contacted.

Preferably, the connection portions are arranged at different positions in axial direction of the small electric motor, each serving the electrical connection of different stator windings. This considerably simplifies the assembly of the small electric motor.

Preferably, the conductor foil comprises exactly two connection portions. This embodiment is particularly recommended for a miniaturized claw pole motor having two stator windings.

Viewed in radial extension, the motor itself does not need any installation space for electrical connections if the conductor foil strip extends between the connection portions at least partly on the outside along the housing. This will further optimize the compact construction if the housing is provided on the outside with a respective groove or flattening for accommodating the conductor foil strip.

A very simple and automatable assembly can be ensured if the housing is closed at both ends by a housing lid, with at least one of the housing lids comprising a chamber-like recess for accommodating a protruding loop of the conductor foil strip.

In a further preferred embodiment of the present invention, the external connection contacts are arranged at an end of the conductor foil strip. This end is here preferably guided through a slit in one of the two housing lids in axial direction out of the housing. This permits a very compact construction in radial direction since in contrast to the prior art this embodiment does not require any plug connections or the like radially outside of the housing.

If in a further preferred embodiment of the present invention polyimide is used as the carrier material of the conductor foil, the handling in bending the flexible conductor foil during assembly turns out to be extremely simple. Moreover, high insulation values and long service lives are achieved with polyimide as the carrier material.

In a further preferred embodiment of the present invention the taps of the stator windings are soldered with the winding connection contacts on the flexible conductor foil. This ensures a reliable and long-lasting contacting which is e.g. not impaired by any deformation of the individual components of the motor subassembly due to different degrees of heating caused by the operating process.

In a further preferred embodiment of the present invention the stator further comprises one pole tooth rim per stator winding, with a connection portion of the conductor foil being respectively arranged in axial direction at the one side of each pole tooth rim and a stator winding at the other side of the pole tooth rim, and the taps of the respective stator windings being guided through openings of the pole tooth rim to the side of the associated connection portion. This embodiment offers the advantage of an extremely simple assembly of a miniaturized claw pole motor.

The assembling operation can once again be simplified if connection portions and stator windings are adhesively bonded to the respectively associated pole tooth rim. This achieves an extremely reliable cohesion of the said components at low costs. Preferably, the bonding operation is carried out prior to the installation of the stator windings in the housing. It is thereby possible to achieve the cohesion between pole tooth rim and respectively associated stator winding and associated connection portion in a simple way, at low costs and above all in an automatable manner, the cohesion of the said components considerably simplifying the further assembling process.

A preferred embodiment of the present invention shall now be explained in more detail with reference to drawings, in which.

As for the following observations, like members are designated by like reference numerals.

Figure 1:
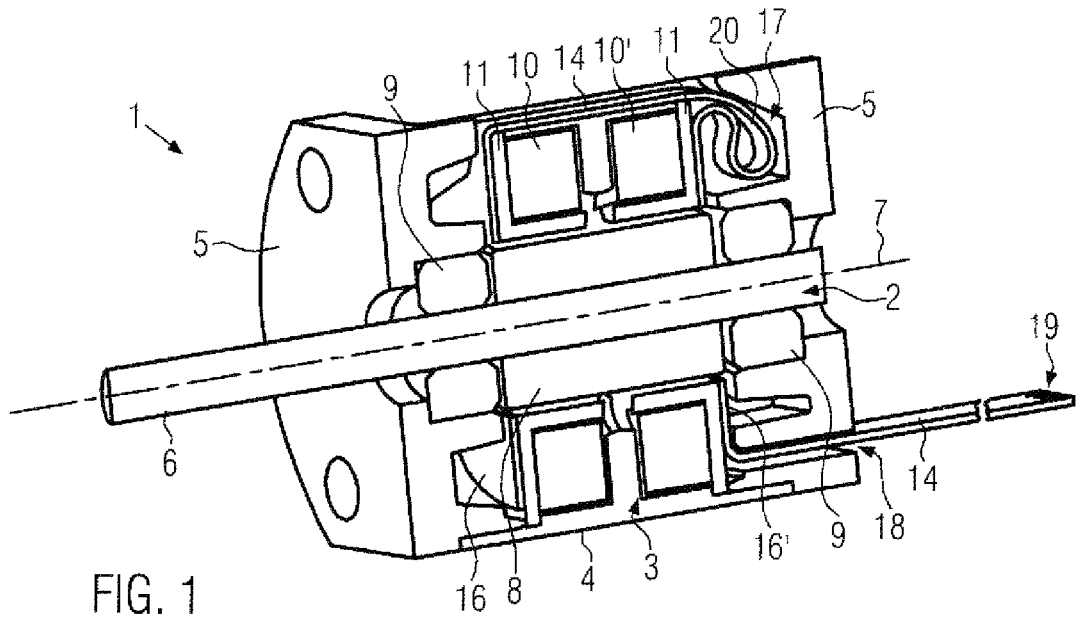
FIG. 1 shows a longitudinal section of a small electric motor according to the invention in an inclined view.

The small electric motor 1 according to the invention, as shown in FIG. 1, is configured in the manner of a claw pole motor and comprises a rotor 2, a stator 3 and a housing 4 which is firmly connected to the stator 3 and which is axially closed at both ends by a respective housing lid 5. The stator 3 of the claw pole motor 1 according to the invention comprises two stator windings 10 and 10', which are given a circular annular configuration and are arranged to be coaxial to the rotational axis 7 of the rotor 2. The stator windings 10 and 10' are each adhesively bonded to an associated pole tooth rim 11 and 11', respectively, and adjoin each other in axial direction. The stator windings 10 and 10' are outwardly enclosed by the housing 4. The rotor 2 of the claw pole motor 1 according to the invention consists substantially of a hollow cylindrical permanent magnet 8 and a shaft 6 which is enclosed by the permanent magnet 8 and connected to said magnet and is supported via a respective sinter slide bearing 9 in the two housing lids 5. A flexible conductor foil 14, which is substantially configured as an elongated strip with two connection portions 16 and 16', is provided for the electrical connection of the two stator windings 10 and 10'.

Figure 2:
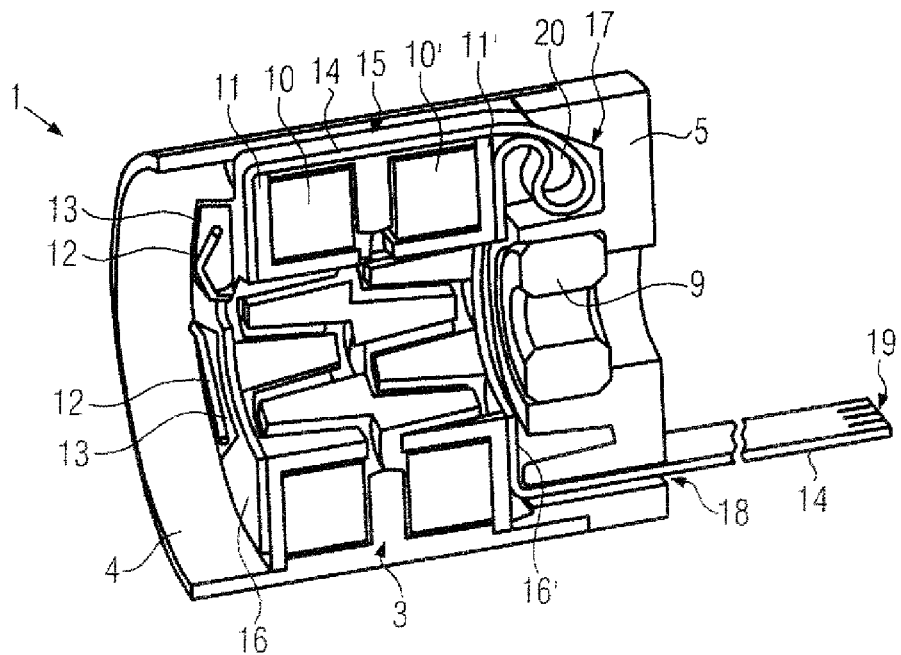
FIG. 2 shows the small electric motor according to the invention as shown in FIG. 1 in a longitudinal section without illustration of the rotor and of the housing lid at the left side.

As can particularly be seen in FIG. 2, the first connection portion 16 serves the connection of the first stator winding 10 and the second connection portion 16' serves the electrical connection of the second stator winding 10'. Both of the two connection portions 16 and 16' are given a substantially circular annular configuration and enclose the rotor 2, which is not shown in FIG. 2, just like stator windings 10 and 10' and associated pole tooth rims 11 and 11'. The first connection portion 16 is arranged in axial direction in front of the stator winding 10 and in front of the first pole tooth rim 11, respectively, and is adhesively bonded to the pole tooth rim 11. The elongated strip of the flexible conductor foil 14 extends from the first connection portion 16 in an axially extending outer groove 15 of the housing 4 to the second connection portion 16', which in axial direction is arranged after the second stator winding 10' and the associated pole tooth rim 11' thereof. The second connection portion 16' is also adhesively bonded to the second claw tooth rim 11'. To permit the assembly of the claw pole motor 1 according to the invention, the connection strip of the conductor foil 14 is slightly longer between the two connection portions 16 and 16' than the axial distance between the two connection portions 16 and 16'. The ensuing excessive section of the elongated strip is therefore accommodated in the finish-mounted state in the form of a loop 20 in a recess 17 of the right-hand housing lid 5.

Since FIG. 2 does not show the rotor and the housing lid at the left side, the contacting of the first stator winding 10 with the first connection portion 16 of the flexible conductor foil 14 is clearly visible. Taps 12 of the stator winding 10 are passed through openings of the pole tooth rim 11 and are soldered onto the winding connection contact 13 of the first connection portion 16. The electrical contacting of the second stator winding 10' by the second connection portion 16' of the flexible conductor foil 14 is not shown, but is carried out by analogy. Subsequent to the second connection portion 16' the conductor foil 14, which is formed as an elongated strip, is axially guided to the outside through a slit 18 in the right-hand housing lid 5. As a consequence, the flexible conductor foil 14 does not need any additional installation space in radial direction and thereby permits a very compact construction. External connection contacts 19 that are each connected to a winding connection contact 13 on one of the two connection portions 16 and 16' by way of a conductor path are positioned at the end of the conductor foil 14 configured as an elongated strip, which end is guided through the slit 18 in the housing lid 5 to the outside.

Figure 3:
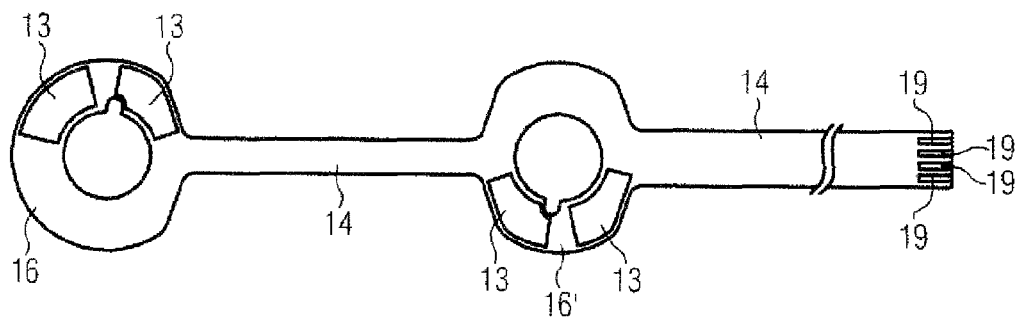
FIG. 3 shows the flexible conductor foil of the small electric motor according to the invention as shown in FIGS. 1 and 2 in the unwound state prior to assembly.

FIG. 3 shows the flexible conductor foil 14, which is configured as an elongated strip, in the unwound state prior to the assembly of the claw pole motor 1 according to the invention. Polyimide is here used as the conductor foil substrate. Each of the two connection portions 16 and 16' comprises two winding connection contacts 13, which in turn are connected via a respective conductor path (not shown) of the conductor foil 14 to one of the four external connection contacts 19. The conductor foil 14, which is configured as an elongated strip, is therefore slightly smaller between the two connection portions 16 and 16' because only two conductor paths extend in that portion whereas four conductor paths have to be accommodated on the section of the elongated strip adjoining the second connection portion 16'. The distance of the connection portions 16 and 16' has been chosen such that the strip can be deformed easily during assembly without mechanical stresses arising on the conductor foil 14, which stresses would damage the conductor paths or the conductor foil substrate. It should be noted that the elongated strip in the unwound state need not extend in a line by necessity. The free end of the elongated strip adjoining the second connection portion 16' in the illustrated case could alternatively e.g. also divert at any desired angle from the second connection portion 16'. For instance, it would be possible that the free end of the elongated strip of the conductor foil 14 is continued from the second connection portion 16' vertically upwards or downwards. In contrast to the illustrated linear extension, this would have the effect that the free end in the finish-mounted state of the small electric motor 1 according to the invention would be positioned offset by 90° in the circumferential direction of the housing 4.

Figure 4:
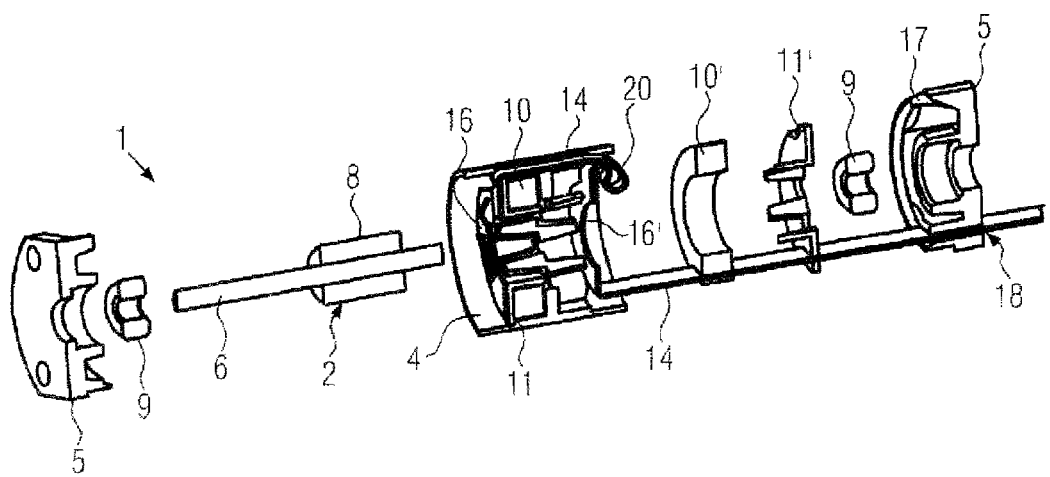
FIG. 4 shows the longitudinal section of FIG. 1 in an exploded view.

FIG. 4 is an exploded view of the longitudinal section of FIG. 1. In this instance, too, the individual components of the claw pole motor according to the invention are each shown in a cut view. The motor housing is integrally manufactured by means of metal injection molding (MIM). Thanks to the use of the conductor foil 14 according to the invention a simple and automatable mounting of the claw pole motor 1 can be achieved. To this end the stator windings 10 and 10' are glued by means of a mounting tool to a side of the associated pole tooth rim 11 and 11', respectively. With the help of a further mounting tool the circular annular connection portions 16 and 16' of the flexible conductor foil 14 are glued to the respectively other side of the pole tooth rims 11 and 11'. The taps 12 of the stator windings 10 and 10', which are shown in FIG. 2, are then soldered onto the winding connection contacts 13 of the conductor foil 14 that are provided for this purpose. The stator 3 of the small electric motor 1 according to the invention is thereby mounted in a few working steps and electrically contacted. The two stator winding packets, each consisting of pole tooth rim 11 and 11', respectively, stator winding 10 and 10', respectively, and associated connection portion 16 and 16', respectively, can thereby be inserted into the housing and aligned. The conductor foil 14, which is formed as an elongated strip, is bent for this purpose into the correct shape, and the free end of the elongated strip is slid through the slit 18 in the right-hand housing lid 5. An exact alignment of the right-hand housing lid 5 is here important, so that the projecting part of the elongated strip of the conductor foil 14, which is configured as a loop 20, can be accommodated in the recess 17 of the right-hand housing lid 5, which recess is provided for this purpose, and the slit 18 simultaneously assumes the correct position for passing the free end of the conductor foil 14 therethrough. The rotor 2 is then mounted, as well as the two housing lids 5.

It should be noted that the conductor foil according to the invention also permits the implementation of an electric motor with more than two stator windings. To this end a correspondingly greater number of connection portions are provided on the conductor foil 14, which is configured as an elongated strip. The elongated strip extends here from the first stator winding outside of the motor housing to the second stator winding, from said second winding at the opposite side again outside of the housing to the third stator winding and further in this way up to the last stator winding and from there through the housing lid.

Of course the implementation of the electrical connection by means of a conductor foil according to the invention is not limited to claw pole motors, but can also be transferred to other types of motors.

The invention claimed is:

1. A small electric motor, particularly a claw pole motor, comprising:
    a housing;
    a stator having at least two stator windings and one pole tooth rim per stator winding;
    a rotor with a rotational axis;
    a flexible conductor foil for electrical connection of the stator windings, wherein said conductor foil includes winding connection contacts, external connection contacts and conductor paths between the winding connection contacts and the external connection contacts, and wherein taps of the stator windings electrically contact the winding connection contacts, the conductor foil being configured as an elongated strip having at least two connection portions arranged in spaced-apart relationship with each other and including the winding connection contacts, wherein the connection portions are arranged at different positions in an axial direction of the small electric motor, each serving for electrical connection of different stator windings,
    a connection portion of the conductor foil being arranged in the axial direction at one side of each pole tooth rim and a stator winding being arranged at another side of the pole tooth rim with the taps of the stator winding being passed through openings of the pole tooth rim to the side of an associated connection portion.

2. The small electric motor according to claim 1, wherein the connection portions are oriented in a direction perpendicular to the rotational axis and are given a substantially circular annular configuration, wherein the rotor is enclosed by the connection portions which are circular annular.

3. The small electric motor according to claim 1, wherein the conductor foil comprises:
    exactly two connection portions.

4. The small electric motor according to claim 3, wherein the strip extends between the connection portions at least partly on an outside along the housing.

5. The small electric motor according to claim 4, wherein on an external side the housing comprises:
    a respective groove or flattening for accommodating the strip.

6. The small electric motor according to claim 1, wherein the housing is closed at both ends by a housing lid, wherein at least one of the housing lids comprises:
    a chamber-like recess for accommodating a projecting loop of the strip.

7. The small electric motor according to claim 1, wherein the external connection contacts are arranged at one end of the strip.

8. The small electric motor according to claim 7, wherein the one end is guided through and out of a slit in one of the two housing lids in the axial direction.

9. The small electric motor according to claim 1, wherein a carrier material of the conductor foil is polyimide.

10. The small electric motor according to claim 1, wherein the taps are soldered with the winding connection contacts.

11. The small electric motor according to claim 1, wherein the connection portions and stator windings are adhesively bonded to the associated pole tooth rim.

12. A method for producing a small electric motor having a housing, a stator with at least two stator windings and one respective pole tooth rim per stator winding, a rotor with a rotational axis, and a flexible conductor foil for electrical connection of the stator windings, wherein the conductor foil includes winding connection contacts, external connection contacts and conductor paths between the winding connection contacts and the external connection contacts, and wherein taps of the stator windings electrically contact the winding connection contacts, the conductor foil being configured as an elongated strip having at least two connection portions arranged in spaced-apart relationship with each other and including winding connection contacts, the connection portions being arranged at different positions in an axial direction of the small electric motor, each serving the electrical connection of different stator windings, the method comprising:
    arranging a connection portion of the conductor foil in the axial direction at the one side of each pole tooth rim:
    arranging a respective stator winding at another side of the pole tooth rim:
    passing the taps of the stator winding through openings of the pole tooth rim to the side of the associated connection portion; and
    adhesively bonding the connection portions and stator windings to the associated pole tooth rim prior to installation of the stator windings in the housing.

* * * * *